US008498262B2

(12) United States Patent
Vesma et al.

(10) Patent No.: US 8,498,262 B2
(45) Date of Patent: Jul. 30, 2013

(54) DIGITAL BROADCAST RECEIVER CAPACITY SIGNALLING METADATA

(75) Inventors: Jussi Vesma, Turku (FI); Harri J. Pekonen, Raisio (FI); Jani Vare, Kaarina (FI)

(73) Assignee: Nokia Corporation (FI)

( * ) Notice: Subject to any disclaimer, the term of this patent is extended or adjusted under 35 U.S.C. 154(b) by 780 days.

(21) Appl. No.: 12/030,657

(22) Filed: Feb. 13, 2008

(65) Prior Publication Data

US 2009/0203326 A1 Aug. 13, 2009

(51) Int. Cl.
*H04W 4/00* (2009.01)

(52) U.S. Cl.
USPC ........... 370/330; 370/336; 370/344; 370/347; 370/442; 370/458; 725/114; 725/120

(58) Field of Classification Search
USPC .. 370/330, 336, 344, 347, 442, 458; 725/105, 725/114, 120
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 2001/0055271 | A1* | 12/2001 | Okada et al. | 370/206 |
| 2006/0252404 | A1 | 11/2006 | Karkas et al. | |
| 2007/0074264 | A1* | 3/2007 | Vesma et al. | 725/135 |
| 2007/0288832 | A1* | 12/2007 | Adachi | 714/780 |
| 2008/0240231 | A1* | 10/2008 | Yang | 375/240.01 |

FOREIGN PATENT DOCUMENTS

| | | |
|---|---|---|
| GB | 2401759 A | 11/2004 |
| JP | 2001292121 | 10/2001 |
| KR | 20060015603 | 2/2006 |
| WO | 2007003996 A1 | 1/2007 |
| WO | 2007072272 A2 | 6/2007 |

OTHER PUBLICATIONS

International Search Report from International Application No. PCT/FI2009/050069, dated Jun. 3, 2009, 14 pages.

ETSI TR 102 377 V1.2.1 (Nov. 2005) Digital Video Broadcasting (DVB); DVB-H Implementation Guidelines: Section 5 Link Layer elements: time slicing and MPE-FEC, pp. 17-34.

Faria, G., et al., "DVB-H: Digital Broadcast services to handheld devices", Proceedings of the IEEE, vol. 94, No. 1, pp. 194-209, Jan. 2006.

Korean Application No. 2010-7019344—Office Action dated Dec. 23, 2011.

Chinese Application No. 2009801086543—Office Action dated Nov. 22, 2011.

(Continued)

*Primary Examiner* — Alvin Zhu
(74) *Attorney, Agent, or Firm* — Banner & Witcoff, Ltd.

(57) ABSTRACT

Embodiments are directed to transmitting receiver-capacity-signalling data that specifies a plurality of receiver capacities to be used for receiving a service. The signalled receiver capacities may include: a type of time interleaver being used and a minimum burst interval between two consequent bursts. The signaled receiver capacities may also specify: how often a physical layer pipe appears in frames, and/or a number of a frame in which a physical layer pipe appears for a first time during a super frame. Embodiments are directed to receiving the receiver-capacity-signalling data and if, based on the received receiver-capacity-signalling data, receiver capacity is sufficient for one or more selected services, performing service discovery and decoding the one or more services. Otherwise, decoding the one or more services may not be performed.

33 Claims, 8 Drawing Sheets

| Syntax | No.of bits |
|---|---|
| receiver_capacity_descriptor(){ | |
| descriptor_tag | 8 |
| descriptor_length | 8 |
| Max_service_bit_rate | 16 |
| Mean_service_bit_rate | 16 |
| Mean_PLP_bit_rate | 16 |
| Max_PLP_bit_rate | 16 |
| Max_FEC_blocks | 16 |
| Time_interleaver_size | 16 |
| Time_interleaver_type | 16 |
| Minimum_burst_interval | 16 |
| Minimum_interval _between_interleaver blocks | 16 |
| Maximum_burst_size | 16 |
| } | |

OTHER PUBLICATIONS

DVB Organization: "46NokiaPanasonic_L1_M&1046.pdf", DVB, Digital Video Broadcasting, C/O EBU—17A Ancienne Route—CH-1218 Grand Saconnex, Geneva—Switzerland, Nov. 16, 2007.

DVD Organization: CM 0912 Rev. 1 / TM3731 Revision 4, TM-SsP252 Revision 9d—DVB, Digital Video Broadcasting, C/O EBU—17A Ancienne Route—CH-1218 Grand Saconnex, Geneva—Switzerland, Feb. 4, 2008.

European Application No. 09 70 9725—Supplementary European Search Report dated Oct. 26, 2012.

* cited by examiner

| Syntax | No.of bits |
|---|---|
| receiver_capacity_descriptor(){ | |
| descriptor_tag | 8 |
| descriptor_length | 8 |
| Max_service_bit_rate | 16 |
| Mean_service_bit_rate | 16 |
| Mean_PLP_bit_rate | 16 |
| Max_PLP_bit_rate | 16 |
| Max_FEC_blocks | 16 |
| Time_interleaver_size | 16 |
| Time_interleaver_type | 16 |
| Minimum_burst_interval | 16 |
| Minimum_interval _between_interleaver blocks | 16 |
| Maximum_burst_size | 16 |
| } | |

| T2 PLP Information Table (T2PIT) | | | | |
|---|---|---|---|---|
| table_id | | | | 8 |
| section_syntax_indicator | | | | 1 |
| reserved_future_use | | | | 2 |
| reserved | | | | 2 |
| section_length | | | | 12 |
| T2_system_id | | | | 16 |
| reserved | | | | 2 |
| version_number | | | | 5 |
| current_next_indicator | | | | 1 |
| section_number | | | | 8 |
| last_section_number | | | | 8 |
| reserved_future_use | | | | 4 |
| PLP_loop_length | | | | 12 |
| | PLP_id | | | 8 |
| | stream_type | | | 8 |
| | **first_frame_id** | | | 8 |
| | **frame_interval** | | | 8 |
| | reserved | | | 4 |
| | service_loop_length | | | 12 |
| | | service_uri_length | | 8 |
| | | | service_uri_byte | 8 |
| CRC_32 | | | | 32 |

FIG. 8

DIGITAL BROADCAST RECEIVER CAPACITY SIGNALLING METADATA

FIELD

Embodiments relate generally to communications networks. More specifically, embodiments relate to digital broadcast receiver capacity signaling information.

BACKGROUND

Digital broadband broadcast networks enable end users to receive digital content including video, audio, data, and so forth. Using a digital video broadcast receiver or a suitable mobile terminal, a user may receive digital content over a wireless digital broadcast network. Digital content can be transmitted in a cell within a network. A cell may represent a geographical area that may be covered by a transmitter in a communication network. A network may have multiple cells, and cells may be adjacent to other cells.

A receiver device, such as a mobile terminal, may receive a program or service in a data or transport stream. The transport stream carries individual elements of the program or service such as the audio, video, and data components of a program or service. Typically, the receiver device locates the different components of a particular program or service in a data stream through Program Specific Information (PSI) or Service Information (SI) embedded in the data stream. However, PSI or SI signalling may be insufficient in some wireless communications systems, such as Digital Video Broadcasting-Handheld (DVB-H) systems. Use of PSI or SI signalling in such systems may result in a sub-optimal end user experience as the PSI and SI tables carrying in PSI and SI information may have long repetition periods. In addition, PSI or SI signalling requires a relatively large amount of bandwidth which is costly and also decreases efficiency of the system.

The data transmission in certain digital video broadcast systems, e.g., Digital Video Broadcast-Terrestrial Second Generation (DVB-T2) is defined to be Time Division Multiplex (TDM) and possibly in addition frequency hopping (Time Frequency Slicing). Thus, Time-Frequency slots are assigned to each service. Further, different levels of robustness (i.e. coding and modulation) may be provided for the services. Considering the foregoing and other signalling factors, a relatively large amount of signalling information is involved. The signalling is transmitted in preamble symbols called P2 symbols following the P1 symbol.

Open System Interconnection (OSI) layer L1 (physical layer) signaling is divided into L1-pre (signalling) and L1 signalling, where L1-pre is of static size while the size of L1 varies as the amount of Physical Layer Pipes (PLPs) varies. L1-pre signalling acts as a key to the L1 signalling by signalling its transmission parameters, i.e., size, code rate, modulation, and the like. To enable the receiver to start receiving services, reception of L1-pre should be possible without other preliminary information than what is obtained from the reception of pilot or preamble symbol P1 (including FFT-size, guard interval (GI), Frame type).

Current signalling solutions proposed for next generation Digital Video Broadcast Terrestrial (DVB-T2) are typically focused on service discovery. Such solutions do not typically take into consideration the receiver capabilities regarding each transmitted service. Such capabilities may include, but are not limited to, the receiver memory needed to de-interleave a desired service. Also, another significant consideration is the ability of the receiver to switch between consequent bursts, when different burst sizes are used.

As such, a signalling mechanism that enables a receiver to recognize situations in which it would start to receive certain services without being capable of receiving the service, for example, having insufficient memory and/or too short of an interval for switching between consequent bursts, would advance the art.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Embodiments are directed to transmitting receiver-capacity-signalling data that specifies a plurality of receiver capacities to be used for receiving a service. The signalled receiver capacities may include: a type of time interleaver being used and a minimum burst interval between two consequent bursts. The signaled receiver capacities may also specify: how often a physical layer pipe appears in frames, and/or a number of a frame in which a physical layer pipe appears for a first time during a super frame. Embodiments are directed to receiving the receiver-capacity-signalling data and if, based on the received receiver-capacity-signalling data, receiver capacity is sufficient for one or more selected services, performing service discovery and decoding the one or more services. Otherwise, decoding the one or more services may not be performed.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 8 shows an example of a T2 PLP information table (T2PIT) in accordance with an embodiment.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
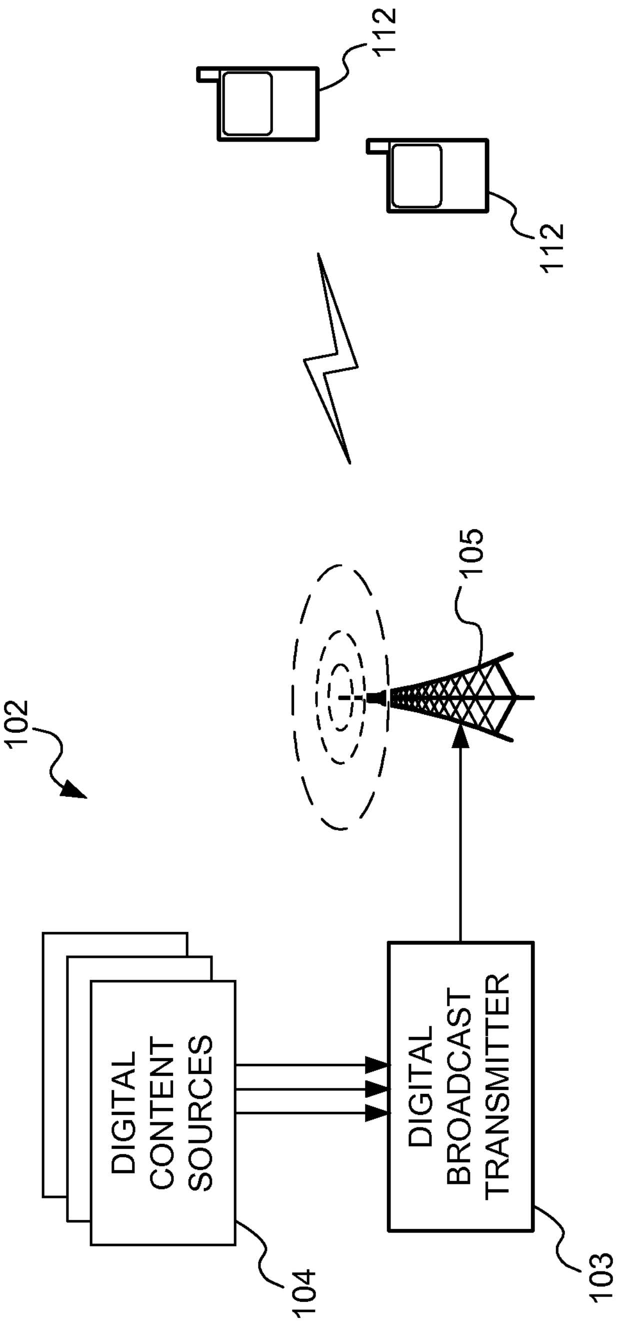
FIG. 1 illustrates a suitable digital broadband broadcast system in which one or more illustrative embodiments of the invention may be implemented.

FIG. 1 illustrates a suitable digital broadband broadcast system 102 in which one or more illustrative embodiments may be implemented. Systems such as the one illustrated here may utilize a digital broadband broadcast technology, for example Digital Video Broadcast-Handheld (DVB-H) or next generation Digital Video Broadcasting-Terrestrial (DVB-T2) or Digital Video Broadcasting-Handheld (DVB-H2) networks. Examples of other digital broadcast standards which digital broadband broadcast system 102 may utilize include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple digital content data streams from multiple digital content sources 104. In various embodiments, the digital content data streams may be IP streams. The processed digital content may then be passed to digital broadcast tower 105 (or other physical transmission component) for wireless transmission. Ultimately, mobile terminals or devices 112 may selectively receive and consume digital content originating from digital content sources 104.

Figure 2:
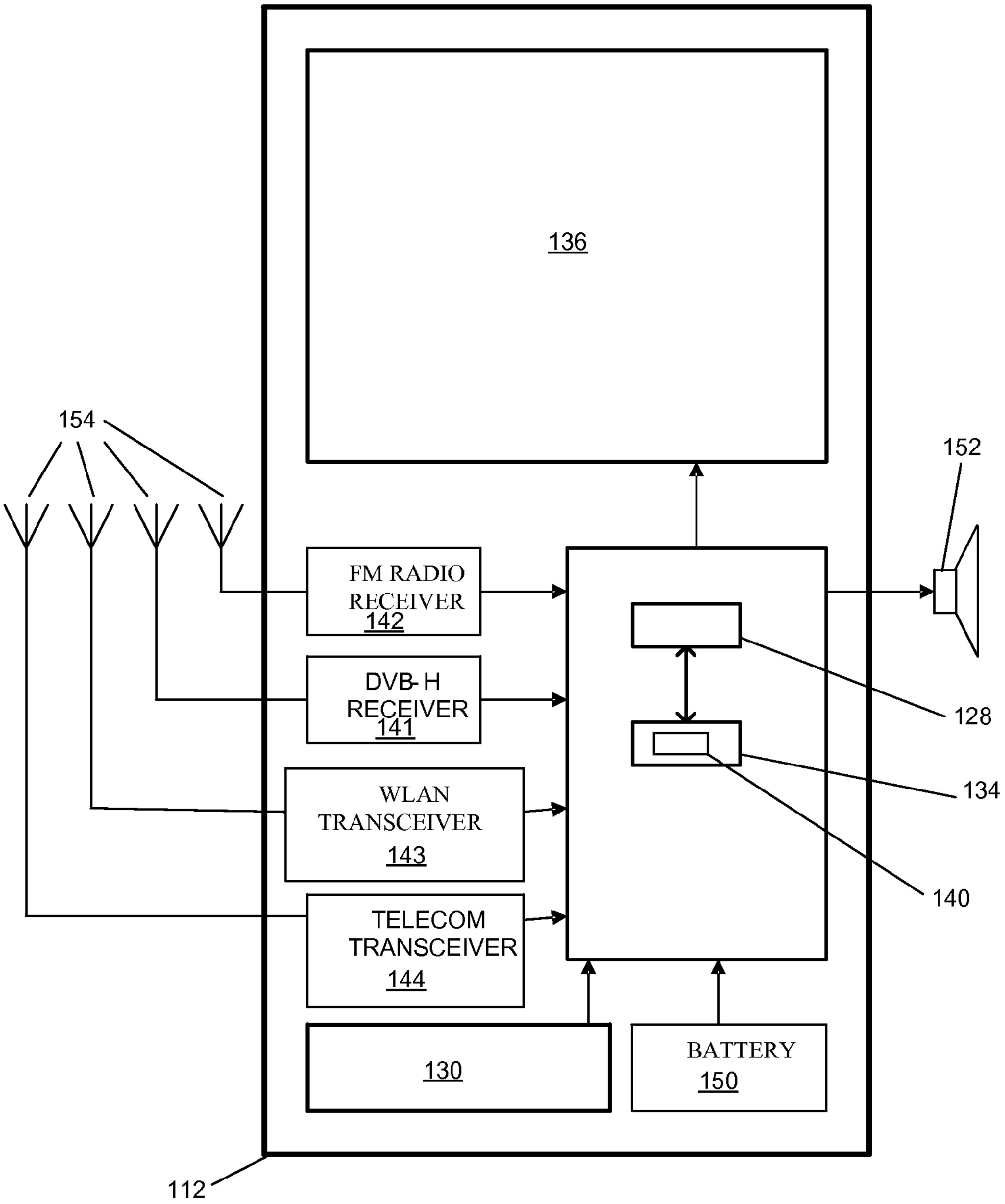
FIG. 2 illustrates an example of a mobile device in accordance with an aspect of the present invention.

As shown in FIG. 2, mobile device 112 may include processor 128 connected to user interface 130, memory 134 and/or other storage, and display 136, which may be used for displaying video content, service guide information, and the like to a mobile-device user. Mobile device 112 may also include battery 150, speaker 152 and antennas 154. User interface 130 may further include a keypad, touch screen, voice interface, one or more arrow keys, joy-stick, data glove, mouse, roller ball, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as handheld DVB-H/H2 or terrestrial DVB-T/T2, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. Mentioned receivers may be separate receiver chipsets or combination of the previous or receiver functionality may be integrated together with some other functionality within receiver device 112. The receiver device may also be a software defined radio (SDR). In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), or DVB-Terrestrial (DVB-T). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an electronic service guide may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol (IP). Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital Video Broadcasting-handheld (DVB-H). The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having an unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

As stated above, the ESG fragments may be transported by IPDC over a network, such as for example, DVB-H to destination devices. The DVB-H may include, for example, separate audio, video and data streams. The destination device must then again determine the ordering of the ESG fragments and assemble them into useful information.

Figure 3:
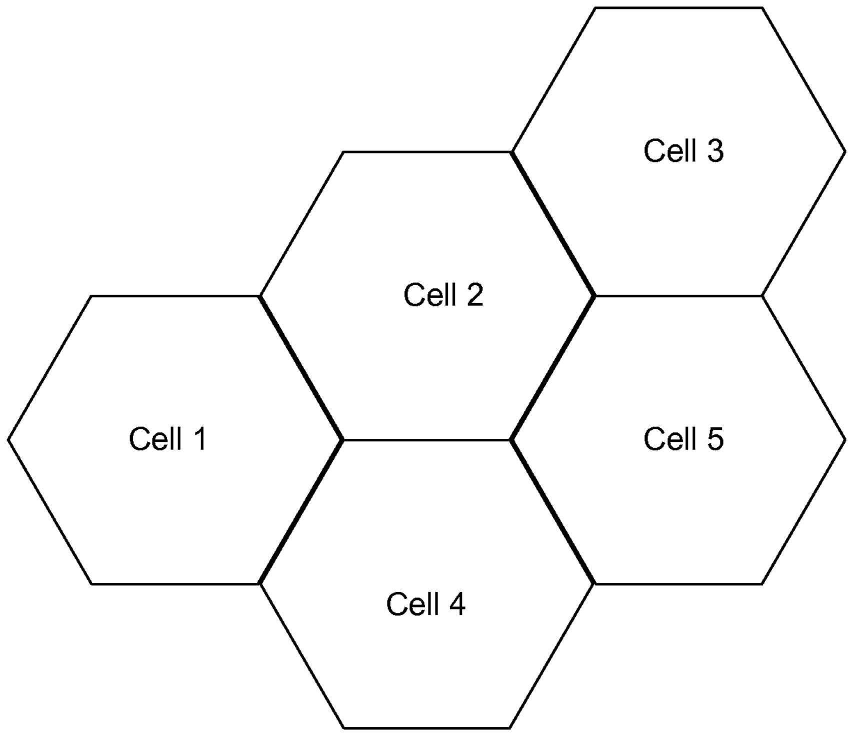
FIG. 3 illustrates an example of cells schematically, each of which may be covered by a different transmitter in accordance with an aspect of the present invention.

In a typical communication system, a cell may define a geographical area that may be covered by a transmitter. The cell may be of any size and may have neighboring cells. FIG. 3 illustrates schematically an example of cells, each of which may be covered by one or more transmitter each transmitting in the same frequency. In this example, Cell 1 represents a geographical area that is covered by one or more transmitter transmitting on a certain frequency. Cell 2 is next to Cell 1 and represents a second geographical area that may be covered by a different frequency. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

Certain embodiments are directed to transmission of Open System Interconnection (OSI) layers L1 (Physical layer) and L2 (Data Link Layer) signalling in Digital Video Broadcasting-Terrestrial Second Generation (DVB-T2) system preamble symbols. Such embodiments enable the transmission of L1 and L2 signalling and thus make it possible for the receiver to discover and receive services. L1 signalling provides information on the physical layer of the system, and L2 provides information on the mapping of services to the physical layer.

Figure 4:
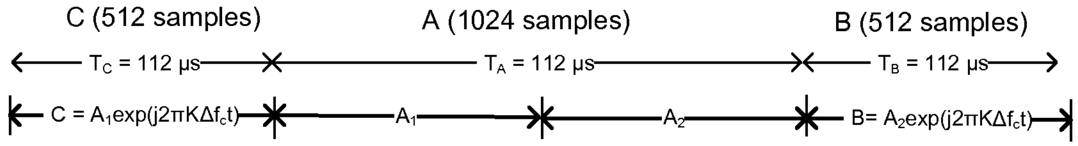
FIG. 4 shows an example P1 structure in accordance with certain embodiments.

FIG. 4 shows an example P1 structure in accordance with certain embodiments. The P1 symbol shown in FIG. 4 consists of a 1 k Orthogonal Frequency Division Multiplexing (OFDM) symbol (part A), which is Differential Binary Phase Shift Keying (DBPSK) modulated in frequency direction by a set of binary sequences. In addition to the main symbol part A, the P1 symbol includes two frequency shifted cyclic extensions. Part C is a frequency shifted version of the first half of A (A1), and B is similarly a frequency shifted version of the latter half of A (A2). Parts C and B thus contain together the same information as part A. The frequency shift is K subcarriers for both C and B.

The Pseudo Random Binary Sequence (PRBS) is called the modulation signaling sequence (MSS), and it carries signaling information. In one embodiment, the P1 may signal: FFT size (3 bits), guard interval (GI) (2 bits), current type of FEF (Future Extension Frame) (2 bits), type(s) of other FEF frames (2 bits), use of Multiple Input Single Output (MISO) system (1 bit), use of Peak-to-Average Power Ratio (PAPR) pilots (1 bit), P2 type (3 bits) which tells the type of the following P2 symbol. These types may include P2 symbols for the second generation DVB-T2, next generation handheld (NGH), Multiple Input Multiple Output (MIMO), or Multiple Input Single Output (MISO).

In one embodiment, the L1 signaling is divided into two sections, as shown in the following Table.

| L1 pre-signalling | L1 signalling |
|---|---|
| TYPE [8b] | // Static param |
| RESERVED [16b] | CELL_ID [16b] |
| L1_COD [3b] | NETWORK_ID [16b] |
| L1_MOD [4b] | TFS_GROUP_ID [16b] |
| L1_FEC_TYPE [1b] | NUM_RF [3b] |
| L1_SIZE [18b] | RF_IDX [3b] |
| NUM_SYMBOLS [5b] | for each RF { |
| BW_EXT [1b] | FREQUENCY [32b] |
| CRC-32 [32b] | } |
| | PILOT_PATTERN [3b] |
| | FRAME_LENGTH [10b] |
| | // Configurable param |
| | NUM_PLP [8b] |
| | RF_SHIFT [8b] |
| | for each PLP { |
| | PLP_ID [8b] |
| | PLP_GROUP_ID [8b] |
| | PLP_COD [3b] |
| | PLP_MOD [4b] |
| | PLP_FEC_TYPE [1b] |
| | } |
| | PLP0_COD [3b] |
| | PLP0_MOD [4b] |
| | PLP0_FEC_TYPE [1b] |
| | // Dynamic param |
| | FRAME_IDX [8b] |
| | NOTIFICATION [1b] |
| | L2_SIZE [18b] |
| | NOTIF_SIZE [18b] |
| | for each PLP { |
| | PLP_NUM_BLOCKS [8b] |
| | PLP_START [18b] |
| | } |
| | CRC-32 [32b] |

The parameters and their indicated values are shown as an exemplary embodiment. The number and values of the parameters may vary in different embodiments. The first section, called L1 pre-signaling, uses a predetermined code rate and modulation, e.g. 1/4 code rate and Quadrature Phase Shift Keying (QPSK), of relatively high robustness. It contains a minimal set of the L1 signaling parameters, including the code rate and modulation for the second section. The second section, called L1 signaling, contains most of the L1 signaling parameters. Its coding rate and modulation is configurable, being signaled in the first section.

The advantage of splitting the L1 signaling is for achieving higher transmission efficiency, since most of the L1 signaling data is transmitted in the second section using a configurable and more efficient code rate and modulation. The minimal L1 signaling data in the first section has a fixed worst-case code rate and modulation and can be decoded by the receiver right away, without any signaling except P1 information. Thus, the first L1 section (L1-pre) acts as a key to the second one.

PLP0 is a special kind of PLP, which is dedicated to carriage of L2 and Notification data. The L2 signaling data is assumed to be present within PLP0, while the presence of the Notification data may change from frame to frame.

The signaling information carried within a frame typically refers to the next frame or the frame after the next frame.

The following table contains L2 signalling parameters.

| L2 signalling |
| --- |
| // Network related<br>cell_id [16b]<br>network_id [16b]<br>frequency [32b]<br>// Service related (new)<br>service_id {<br>plp_id [8b]<br>frame loop {<br>frame_idx [8b]<br>}<br>} |

The L1 signaling parameters are designed in such a way that T2 specific amendments to the Program Specific Information/Service Information (PSI/SI) as specified in first generation DVB-T systems are minimal. As can be seen from the L2 signalling table above, the new L2 data is the description of how each service is mapped onto the Time Frequency Slicing (TFS) structure.

The main task of the L1 pre-signalling is to tell the receiver how to receive the rest of the L1 signaling. Various L1 pre-signalling fields will now be discussed.

TYPE: This composite field includes information describing for example: (1) the transmission system: DVB-T2, DVB-H2, or future extensions; (2) the diversity scheme: examples thereof are Multiple Input Multiple Output (MIMO), Multiple Input Single Output (MISO), and their type; and (3) the used protocols for the services: Transport Stream (TS), Generic Stream Encapsulation (GSE).

L1_COD: Code rate of the main L1 signaling data block.

L1_MOD: Modulation of the main L1 signaling data block.

L1_FEC_TYPE: FEC block size used for the main L1 signaling data block.

L1_SIZE: Size of the main L1 signaling data block, in OFDM cells.

NUM_SYMBOLS: The total number of symbols used for carrying the L1 pre-signaling and L1 signaling. This parameter is used by the receiver in order to buffer a sufficient number of symbols, prior to decoding and de-mapping the relevant parts.

BW_EXT: Bandwidth extension flag, to signal the use of extended bandwidth for 16K and 32K modes.

CRC-32: This field ensures that the L1 pre-signaling data is error free.

The L1 pre-signaling data block is received without the help of any other signaling, so the following should be predetermined: (1) code rate and modulation, (2) block size, and (3) cell mapping onto the P2 preamble. As L1 pre-signaling contains only static parameters, which do not change during normal operation, receiver may in one embodiment receive and combine information from several frames and so improve robustness.

The L1 signaling, shown in the right column of the L1 Signalling table above, conveys information that enables the discovery and reception of PLPs. In one embodiment, it is further subdivided into three groups of parameters, according to their updating frequency: static, configurable, and dynamic.

Static parameters are fundamental network parameters, which do not change during normal operation. Several static parameters will now be discussed.

CELL_ID: This is a 16-bit field which uniquely identifies a cell.

NETWORK_ID: This is a 16-bit field which serves as a label to identify the delivery system, about which the Network Information Table (NIT) informs, from any other delivery system. Allocations of the value of this field are found in ETR 162 [ETSI Technical Report: Digital broadcasting systems for television, sound and data services; Allocation of Service Information (SI) codes for Digital Video Broadcasting (DVB) systems].

TFS_GROUP_ID: This uniquely identifies a TFS group when multiple TFS groups coexist.

NUM_RF: Number of RF channels in the TFS group.

RF_IDX: Index of the current RF channel within its TFS structure, between 0 and NUM_RF-1.

FREQUENCY: Carrier frequency (channel center frequency including possible offset) for each RF channel in the TFS group. The order of frequencies is implicit from the loop order. The receiver can also discover these frequencies by itself during the initial scan, so under certain circumstances these parameters may not be needed.

PILOT_PATTERN: pilot pattern used for the data OFDM symbols.

FRAME_LENGTH: number of data OFDM symbols per frame.

Configurable parameters change rarely, e.g., when services are added or removed. Several configurable parameters will now be discussed.

NUM_PLP: Number of PLPs in the TFS multiplex.

RF_SHIFT: Incremental shift, in terms of OFDM symbols, between adjacent RF channels. Under certain circumstances, this parameter may change from frame to frame, in which case it belongs in the dynamic parameters category.

PLP_ID: ID of each PLP. Using IDs instead of indices enables a more flexible allocation of the PLPs within the TFS multiplex.

PLP_GROUP_ID: Specifies the PLP group, into which the PLP belongs.

PLP_COD: Code rate of each PLP.

PLP_MOD: Modulation of each PLP.

PLP_FEC_TYPE: FEC block size for each PLP (0=16200, 1=64800).

PLP0_COD: Code rate of PLP0 (signaling PLP).

PLP0_MOD: Code rate of PLP0 (signaling PLP).

PLP0_FEC_TYPE: FEC block size for PLP0 (0=16200, 1=64800).

Dynamic parameters change for each frame. Several dynamic parameters will now be discussed.

FRAME_IDX: Index of the current frame (0 . . . SUPER_FRAME_LENGTH).

NOTIFICATION: This field indicates if notification data is present in the current frame.

PLP_NUM_BLOCKS: Number of FEC blocks in the current frame, for each PLP.

PLP_START: Start address of each PLP. Actually, what is signaled is the start address of the first slot in RF0. As the incremental time offset (shift) between adjacent RF channels is assumed to be constant, the start addresses of the slots in the other RF channels can be computed by the receiver. Therefore, there is no need for signaling the start addresses of each RF channel.

L2_SIZE: Size of the L2 data in PLP0 for the current frame. It is used for separating L2data from notification data in PLP0.

NOTIF_SIZE: Size of the notification in PLP0 for the current frame. It is used for separating notification data from L2 data in PLP0.

The sizes of the slots in the TFS structure may not be signaled explicitly. In one embodiment the number of FEC blocks in each PLP is signalled, from which the number of OFDM cells per PLP can be computed knowing the constellation size. Once the number of OFDM cells per frame per PLP is known, the size of each slot can be computed assuming that slots have the same size, up to a single cell.

The L2 signaling includes PSI/SI signaling information that describes the mapping of the services within the transport stream and onto the TFS multiplex. The latter means that PSI/SI is amended to enable end-to-end mapping of the services onto the PLPs of the TFS frame. The TFS frame duration sets the minimum repetition interval of any PSI/SI table. L2 signaling data is carried within PLP0, together with the Notification data (when available).

Co-scheduled signaling means that the dynamic L1 signaling data specific to a PLP, i.e. slot allocation, is multiplexed with the payload data of that particular PLP. This allows the receiver following a particular service to get the dynamic L1 signaling information without having to receive P2 every frame.

The notification channel can be used for transmitting notifications and carousel data, which are available to the receiver regardless of which PLP is being received. In one embodiment the Notification data is carried within PLP0, together with the L2 signaling data.

Figures 5, 6:
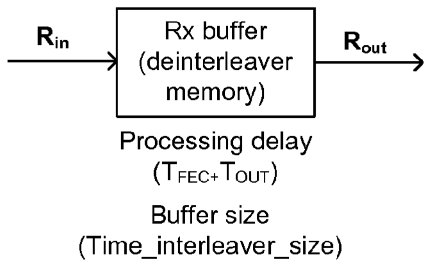
FIG. 5 illustrates an example of receiver capacity signalling metadata in accordance with certain embodiments.
FIG. 6 illustrates a schematic diagram of a receiver buffer in accordance with certain embodiments.

In accordance with certain embodiments, at least the type of time interleaver being used and a minimum burst interval (between two consequent bursts) is signalled within OSI layer 2, data link layer (L2) signaling information. The signalling may be realized via a new descriptor or other amendment to the L2 signalling. In some circumstances, such signalling or parts of it may also be used and/or provided within the OSI layer 1, physical layer (L1) signaling information. FIG. 5 illustrates an example of receiver capacity signalling metadata, when it is carried as a descriptor within L2, in accordance with certain embodiments. The structure, parameters and field sizes shown in FIG. 5 are exemplary for certain embodiments. The semantics of the fields shown in FIG. 5 may be as follows:

| | |
|---|---|
| Max_service_bit_rate: | This field indicates the maximum bit rate for the transmitted service. Given value may be over one frame or super frame. |
| Mean_service_bit_rate: | This field indicates the mean bit rate for the transmitted service. Given value may be over one frame or super frame. |
| Mean_PLP_bit_rate: | This field indicates the mean bit rate for the PLP. Given value may be over one frame or super frame. |
| Max_PLP_bit_rate: | This field indicates the maximum bit rate for the PLP. Given value may be over one frame or super frame. |
| Max_FEC_blocks: | This field indicates the maximum number of FEC blocks for one PLP within a (time) interleaver period. or frame or super frame. |
| Time_interleaver_size: | This field indicates a minimum size of the time-interleaver memory for use in receiving a particular PLP. |
| Time_interleaver_type: | This field indicates the type of the time-interleaver. The different time interleaver type indicates the receiver the methods for deinterleaving the data from one or more received frames. |
| Minimum_burst_interval: | This field indicates the minimum interval between the two consequent bursts. Given value shall apply both inside the frame and at the frame border. |
| Minimum_interval_between_interleaver blocks: | This field indicates the minimum interval between the two consequent interleaver blocks if it is different than Minimum_burst_interval. |
| Maximum_burst_size | This field indicates the maximum burst size for one PLP. |

A descriptor, in accordance with certain embodiments, may be associated with each service, e.g., within the L2 signalling structure, which associates services between the L1 and with the information provided within the higher layers (i.e. OSI layers 3-7).

Examples of such tables are a Program Map Table (PMT), a Service Description Table (SDT), and a T2 PLP Information Table (T2PIT).

In accordance with one embodiment, this signalling metadata is associated per frame, T2 system, and/or T2 network.

FIG. 6 illustrates a schematic diagram of a receiver buffer in accordance with certain embodiments. The buffer may be the same as the deinterleaver memory, which, in accordance with certain embodiments, may be located in memory of a terminal, wherein the memory is separate from the receiver. In such embodiments, the receiver may include a Radio Frequency (RF) front-end and channel decoding and demultiplexing. The input of such a receiver is an RF signal, and the output is network layer datagrams.

The data is received at the rate of $R_{in}$, and the buffer output rate, the leakage rate, is $R_{out}$. The buffer should have a size of at least the size signaled by Time_interleaver_size. If the buffer size of the receiver is smaller than that, the receiver may not be able to receive the service. When the data is written into the buffer, there is a certain processing delay (including, e.g., deinterleaving and Forward Error Correction (FEC) decoding time) before the data may be read out of the buffer.

Figure 7:
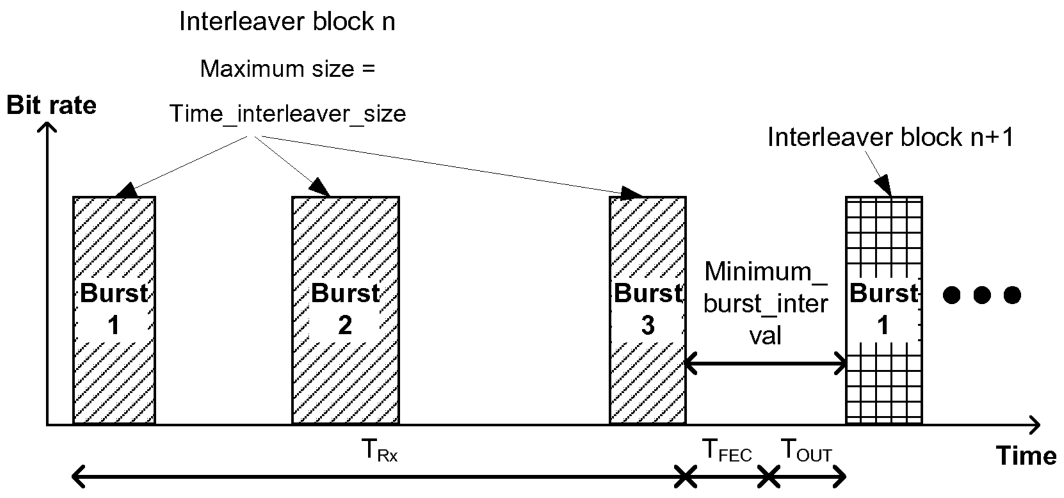
FIG. 7 illustrates various relationships between interleaver blocks in accordance with certain embodiments.

FIG. 7 illustrates the relationship between multiple bursts carrying data and error correction data, e.g. FEC data and one interleaving block, as well as the related time intervals and bit rates, in accordance with certain embodiments. One burst may contain the end of first time interleaver data and the start of second time interleaver data. In the example shown in FIG. 7, the receiver stores all the three bursts of interleaver block n. Then, the receiver deinterleaves, decodes (including error correction), and writes the data into output, which takes altogether $T_{FEC}+T_{OUT}$. Minimum_burst_interval determines an upper bound for $T_{FEC}+T_{OUT}$ in the case of a single Rx buffer implementation.

In the example of FIG. 7, an interleaving block covers three bursts. The total amount of data in the three bursts does not exceed Time_interleaver_size. The receiver receives the bursts during $T_{Rx}$. After that, the receiver deinterleaves and decodes the data, which takes $T_{FEC}$. Then, the data is read out of the deinterleaver memory, which takes $T_{OUT}$. Deinterleaving and decoding the data and reading out of the deinterleaver memory may overlap. The deinterleaver memory should be empty before the first burst of the next interleaver block comes. If this is not the case, the receiver should have some extra memory (beyond Time_interleaver_size) to store the new burst(s).

In accordance with certain embodiments, a super frame includes multiple frames, an integer number of repeat periods, and an integer number of interleaving blocks for any PLP, which is used when the interleaving length is over multiple frames.

In accordance with certain embodiments, the configurable (and possibly the static) part of the L1 signaling is changed on a super frame border. If the receiver receives co-scheduled signaling, there can be a flag that indicates a change in L1 parameters in the next super frame. Then, the receiver may check the new parameter values (e.g. code rate, modulation) from L1 located in P2 symbol.

A repeat period is a set of frames in accordance with certain embodiments. After repeat_period, the mapping pattern of the PLP's into the frames starts to repeat itself. In one embodiment, the repeat period (repeat_period) may be signalled.

Figure 9:
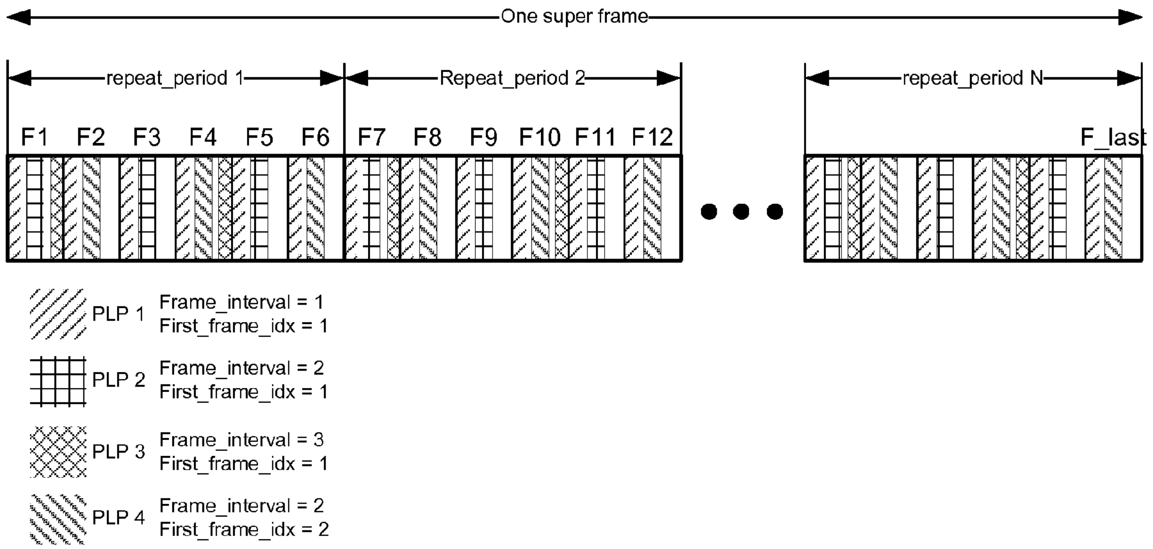
FIG. 9 illustrates the mapping of the PLP's into the frame structure in accordance with certain embodiments.

FIG. 9 illustrates the mapping of the PLP's into the frame structure in accordance with certain embodiments. In a basic case, a PLP has a burst in every frame. For example, PLP 1 has a burst in every frame shown in FIG. 9. Some PLP's may, however, jump over frames so that a particular PLP appears in every kth frame (e.g., PLP's 2-4). Two or more PLP's can also alternate frames. For instance, PLP 2 and PLP 4 each appear in every second frame in an alternating manner.

The super frame shown in FIG. 9 includes frames F1 to F_last. There are four different PLP's. PLP 1 appears in every frame. PLP 2 appears in every second frame starting with F1. PLP 3 appears in every third frame starting with F1, and PLP 4 appears in every second frame starting with F2.

The PLPs may be carried, in one embodiment, on one radio frequency (RF) channel and, in another embodiment, on more than one RF channel.

Signaling parameter Frame_interval specifies how often a PLP appears in frames. For example, if Frame_interval=1, a PLP is in every frame, if Frame_interval=2, the PLP is in every second frame, and so on.

On the other hand, First_frame_idx specifies the number of the frame in which the PLP appears for the first time during the super frame. The pattern of PLP to frame mapping starts to repeat itself after repeat_period. That is, the repeat_periods look equivalent with respect to PLP mapping. In the example of FIG. 9, the length of the frame period is 2*3=6 frames. There should be an integer number of frame periods in the super frame (N in the example of FIG. 9).

For any PLP, First_frame_idx should be less than or equal to Frame_interval.

The co-scheduled signaling (or in-band signaling) that is carried by each PLP, indicates the location of the next burst or group of bursts (delta value). The transmitter should form and buffer two bursts in order to know the delta value and to insert it into the first burst. This increases the end-to-end delay of the T2 system. A PLP that jumps over several frames may significantly increase the end-to-end delay. This may be avoided by not using co-scheduled signaling for such PLP's. Moreover, the delta value is carried by the P2 symbol, more precisely, by the previous P2 symbols. Therefore, an extra delay is not introduced. A specific value may be used to indicate that the delta value in co-scheduled signaling is not used (e.g., all zero or 0xFFFF).

The following is a summary of exemplary PLP specific signaling parameters in accordance with certain embodiments:

First_frame_idx: This 8-bit field defines the frame number where the PLP appears for the first time during the super frame.

Frame_interval: This 8-bit field defines the interval for the frame within the super_frame after the frame identified with the First_frame_idx, where the PLP is present. When this field has been set to value '0', the PLP appears in every frame of the superframe.

The first_frame_idx and frame_interval may be provided within L2 signalling (e.g., in T2 PLP information table or within PLP_identifier descriptor that of SDT) or within L1signalling. An example of PLP_identifier descriptor with first_frame_idx and frame_interval, in accordance with an embodiment, is as follows:

| Syntax | Number of bits |
|---|---|
| PLP__identifier__descriptor( ){ | |
| descriptor__tag | 8 |
| descriptor__length | 8 |
| descriptor__tag__extension | 8 |
| PLP__id | 8 |
| frame__type | 8 |
| TFS__group__id | 8 |
| First__frame__idx | 8 |
| Frame__interval | 8 |
| } | |

The fields shown above may be Unsigned Integers with Most Significant Bit First (UIMSBF). The fields and values for the number of bits in each field set forth above are exemplary for one embodiment. Other embodiments may use other fields and/or other numbers of bits.

FIG. 8 shows an example of a T2 PLP information table (T2PIT) in accordance with an embodiment. First_frame_id and frame_interval are shown in bold font in FIG. 8.

Figure 10:
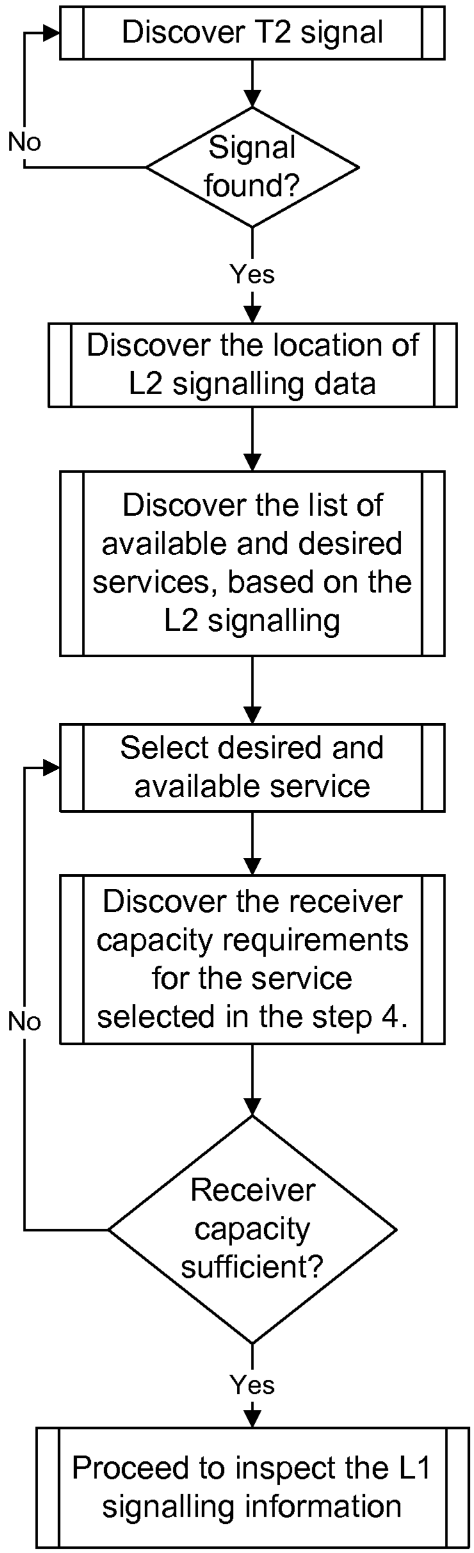
FIG. 10 shows steps performed by a receiver in accordance with certain embodiments.

FIG. 10 shows steps performed by a receiver in accordance with certain embodiments. FIG. 10 is an example that applies to a DVB-T2 system. But other embodiments are applicable to other types of communication systems.

First the receiver seeks for the DVB-T2 signals until it finds one. Then, the receiver discovers the location of L2 signalling data and decodes the L2 signalling data. The list of available and desired services is then discovered based on the L2 signalling. The receiver then selects the available and desired service. Several services may be selected if the capacity to be used for receiving the services does not exceed the receiver's capabilities.

The receiver then discovers, from the signaling metadata, the receiver capacities specified for the selected service (or services). Such receiver capacities may include, but are not limited to, the amount of memory to be used for de-interleaving of the service and/or the support to be used to de-interleave the service, in general, and the minimum burst interval of the consequent bursts of a service.

If the receiver capacity is sufficient for the selected service (or services), the receiver continues the service discovery process by inspecting the L1 signalling information, and then the receiver may decode the service. Otherwise, if the receiver capacity is insufficient for the selected service (or services), the receiver may then indicate that the quality of the service may be declined or that the service is not supported.

Based on the time interval between bursts (Minimum_burst_interval), the receiver may, for example, decide what kind of handover procedure will be applied. In a similar way, the receiver may decide what other operations/functions may be done during the time between bursts.

In this way, a receiver may be able to determine when a network contains services for which reception is beyond the receiver's capability. Further, a receiver may be able to consume multiple services in situations in which the combined receiver capabilities of the selected services, as specified by the signaling metadata, do not overload the receiver's capabilities.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:

transmitting receiver-capacity-signalling data that specifies a plurality of receiver capacities to be used for receiving one or more physical layer pipes of a service, data for the one or more physical layer pipes being included in one or more time sliced bursts within one or more data frames, wherein the plurality of receiver capacities includes a type of time interleaver being used and a minimum burst interval between two bursts, and wherein the plurality of receiver capacities is signaled at least within physical layer signaling information.

2. The method of claim 1, wherein the plurality of receiver capacities further includes a maximum number of FEC blocks for a particular physical layer pipe of the one or more physical layer pipes within a time interleaver period, a frame, or a super frame.

3. The method of claim 1, wherein the plurality of receiver capacities further includes a minimum size of a time-interleaver memory for use in receiving a particular physical layer pipe of the one or more physical layer pipes.

4. The method of claim 1, further comprising transmitting physical layer pipe specific signaling parameters, the physical layer pipe specific signaling parameters including an indication of how often a physical layer pipe appears in frames.

5. The method of claim 1, further comprising transmitting physical layer pipe specific signaling parameters, the physical layer pipe specific signaling parameters including an indication of a number of a frame in which a physical layer pipe appears for a first time during a super frame.

6. The method of claim 1, wherein a first portion of the plurality of receiver capacities is signaled within data link layer signaling information and a second portion of the plurality of receiver capacities is signaled within the physical layer signaling information, and wherein the first portion includes the type of time interleaver being used.

7. The method of claim 1, wherein the plurality of receiver capacities further includes a first bit rate specifying a rate for the service, a second bit rate specifying a rate for the one or more physical layer pipes and a maximum burst size for the one or more physical layer pipes.

8. The method of claim 7, wherein the plurality of receiver capacities is signaled only within the physical layer signaling information.

9. The method of claim 7, wherein the first bit rate is a maximum bit rate for the service.

10. The method of claim 7, wherein the first bit rate is a mean bit rate for the service.

11. The method of claim 7, wherein the second bit rate is a mean bit rate for the one or more physical layer pipes.

12. The method of claim 7, wherein the second bit rate is a maximum bit rate for the one or more physical layer pipes.

13. An apparatus comprising:

one or more processors; and a memory storing computer-executable instructions configured to, with the one or more processors, cause the apparatus to at least:

transmit receiver-capacity-signalling data that specifies a plurality of receiver capacities to be used for receiving one or more physical layer pipes of a service, data for the one or more physical layer pipes being included in one or more time sliced bursts within one or more data frames, wherein the plurality of receiver capacities includes a type of time interleaver being used and a minimum burst interval between two bursts, and wherein the plurality of receiver capacities is signaled at least within physical layer signaling information.

14. The apparatus of claim 13, wherein the plurality of receiver capacities further includes a maximum number of FEC blocks for a particular physical layer pipe of the one or more physical layer pipes within a time interleaver period, a frame, or a super frame.

15. The apparatus of claim 13, wherein the plurality of receiver capacities further includes a minimum size of a time-interleaver memory for use in receiving a particular physical layer pipe of the one or more physical layer pipes.

16. The apparatus of claim 13, wherein the memory further stores computer-executable instructions configured to, with the one or more processors, cause the apparatus to transmit physical layer pipe specific signaling parameters, the physical layer pipe specific signaling parameters including an indication of how often a physical layer pipe appears in frames.

17. The apparatus of claim 13, wherein the memory further stores computer-executable instructions configured to, with the one or more processors, cause the apparatus to transmit physical layer pipe specific signaling parameters, the physical layer pipe specific signaling parameters including an indication of a number of a frame in which a physical layer pipe appears for a first time during a super frame.

18. The apparatus of claim 13, wherein a first portion of the plurality of receiver capacities is signaled within data link layer signaling information and a second portion of the plurality of receiver capacities is signaled within the physical layer signaling information, and wherein the first portion includes the type of time interleaver being used.

19. The apparatus of claim 13, wherein the plurality of receiver capacities further includes a first bit rate specifying a rate for the service, a second bit rate specifying a rate for the one or more physical layer pipes and a maximum burst size for the one or more physical layer pipes.

20. The apparatus of claim 19, wherein the plurality of receiver capacities is signaled only within the physical layer signaling information.

21. The apparatus of claim 19, wherein the first bit rate is a maximum bit rate for the service.

22. The apparatus of claim 19, wherein the first bit rate is a mean bit rate for the service.

23. The apparatus of claim 19, wherein the second bit rate is a mean bit rate for the one or more physical layer pipes.

24. The apparatus of claim 19, wherein the second bit rate is a maximum bit rate for the one or more physical layer pipes.

25. A method comprising:

receiving receiver-capacity-signalling data that specifies a plurality of receiver capacities to be used for receiving one or more physical layer pipes of a service, data for the one or more physical layer pipes being included in one or more time sliced bursts within one or more data frames, wherein the plurality of receiver capacities includes a type of time interleaver being used and a minimum burst interval between two bursts, and wherein the plurality of receiver capacities is signaled at least within physical layer signaling information.

26. The method of claim 25, further comprising:

determining whether receiver capacity is sufficient for the service based on the received receiver-capacity-signalling data; and upon determining that the receiver capacity is sufficient, performing service discovery and decoding the service.

27. The method of claim 25, further comprising:

determining whether receiver capacity is sufficient for the service based on the received receiver-capacity-signalling data; and upon determining that the receiver capacity is insufficient, providing an indication that the receiver capacity is insufficient.

28. An apparatus comprising:

one or more processors; and a memory storing executable instructions configured to, with the one or more processors, cause the apparatus to at least:

receive receiver-capacity-signalling data that specifies a plurality of receiver capacities to be used for receiving one or more physical layer pipes of a service, data for the one or more physical layer pipes being included in one or more time sliced bursts within one or more data frames, wherein the plurality of receiver capacities includes a type of time interleaver being used and a minimum burst interval between two bursts, and wherein the plurality of receiver capacities is signaled at least within physical layer signaling information.

29. The apparatus of claim 28, wherein the memory further stores computer-executable instructions configured to, with the one or more processors, cause the apparatus to:

determine whether receiver capacity is sufficient for the service based on the received receiver-capacity-signalling data; and upon determining that the receiver capacity is sufficient, perform service discovery and decode the service.

30. The apparatus of claim 28, wherein the memory further stores computer-executable instructions configured to, with the one or more processors, cause the apparatus to:

determine whether receiver capacity is sufficient for the service based on the received receiver-capacity-signalling data; and upon determining that the receiver capacity is insufficient, provide an indication that the receiver capacity is insufficient.

31. One or more non-transitory computer readable media storing computer-executable instructions configured to, when executed, cause an apparatus to at least:

transmit receiver-capacity-signalling data that specifies a plurality of receiver capacities to be used for receiving one or more physical layer pipes of a service, data for the one or more physical layer pipes being included in one or more time sliced bursts within one or more data frames, wherein the plurality of receiver capacities includes a type of time interleaver being used and a minimum burst interval between two bursts, and wherein the plurality of receiver capacities is signaled at least within physical layer signaling information.

32. The one or more non-transitory computer readable media of claim 31, further storing computer-executable instructions configured to, when executed, cause the apparatus to transmit physical layer pipe specific signaling parameters, the physical layer pipe specific signaling parameters including an indication of how often a physical layer pipe appears in frames.

33. The one or more non-transitory computer readable media of claim 31, further storing computer-executable instructions configured to, when executed, cause the apparatus to transmit physical layer pipe specific signaling parameters, the physical layer pipe specific signaling parameters including an indication of a number of a frame in which a physical layer pipe appears for a first time during a super frame.

* * * * *